United States Patent [19]

Ryabenko et al.

[11] 4,125,596

[45] Nov. 14, 1978

[54] METHOD OF PRODUCING SULPHURIC ACID

[76] Inventors: Evgeny A. Ryabenko, B. Cheremushkinskaya ulitsa, 2 korpus 2, kv. 26.; Grigory Z. Bljum, ulitsa Kominterna, 32/5, kv. 23.; Tatyana B. Naida, Anadyrsky proezd, 17/1, kv. 65; Alexandr E. Golub, shosse Entuziastov, 212, korpus 5, kv. 134; Natalya I. Galchina, Rusakovskaya ulitsa, 6, kv. 65; Alexandr R. Aronov, Veshnyakovskaya ulitsa, 6, korpus 3, kv. 71; Natalya F. Semenova, Veshnyakovskaya ulitsa, 35/26, kv. 23; Ljudmila K. Raginskaya, ulitsa Marshala Vershinina, 4, korpus 2, kv. 8; Alexandr M. Vonsovsky, Oktyabrskaya ulitsa, 68, kv. 16, all of Moscow, U.S.S.R.

[21] Appl. No.: 788,904

[22] Filed: Apr. 19, 1977

[51] Int. Cl.$^2$ .................... C01B 17/72; C01B 17/90; B01D 7/00
[52] U.S. Cl. .................................. 423/522; 423/531; 23/294 R
[58] Field of Search ...................... 423/522, 531, 532; 23/294 R; 55/83

[56] References Cited

U.S. PATENT DOCUMENTS

| 3,232,705 | 2/1966 | Klingler et al. | 423/522 |
| 3,294,650 | 12/1966 | Manteufel | 423/531 |
| 3,992,159 | 11/1976 | Mitchell | 23/294 R |

OTHER PUBLICATIONS

Wilke, C. R., Sublimation its Application in Chemical Processing, Chemical Industries, Jul. 1948, pp. 34–38, 122, 123.

*Primary Examiner*—Earl C. Thomas
*Assistant Examiner*—Gary P. Straub
*Attorney, Agent, or Firm*—Steinsberg & Blake

[57] ABSTRACT

The method of preparing sulphuric acid comprises distilling sulphur trioxide with subsequent sublimation condensation by cooling with a coolant having a temperature of from $-5°$ to $-15°$ C. The obtained sulphur trioxide is then treated with sulphuric acid having a concentration in the range of 95 to 96 per cent. The thus prepared sulphuric acid contains impurities in the range of $10^{-7} - 10^{-8}$ per cent by weight of cations, and $5 \times 10^{-5}$ per cent by weight of anions, $SO_3''$ in particular.

2 Claims, No Drawings

METHOD OF PRODUCING SULPHURIC ACID

The invention relates to methods of producing sulphuric acid.

Sulphuric acid of particularly high purity is used in the manufacture of semiconductors, quantum generators, optical instruments, etc. The amount of impurities in the acid should be less than $10^{-5}$ to $10^{-6}$ percent by weight for admixtures of various cations, and less than $1 \times 10^{-4}$ percent by weight for anions, e.g. $SO_3''$.

Known in the art is a method of preparing sulphuric acid monohydrate by zone melting. In this process, sulphur trioxide undergoes multiple melting and crystallization, with translocation of the molten zone along the sulphuric acid monohydrate ingot. The zone melting is effected on a plant consisting of four annular zones with annular cooling devices located between them.

The cation impurities in sulphuric acid obtained by this method are $1 \times 10^{-4}$ to $1 \times 10^{\times 6}$ percent by weight.

Also known in the art is a method of producing sulphuric acid which includes the steps of preliminary distillation of sulphuric anhydride and its subsequent sorption in water or sulphuric acid. The obtained monohydrate is then diluted with water to the required concentration and the resulting acid is blown with air to remove sulphur dioxide.

Ordinary distillation of sulphur trioxide, used in this method, does not ensure the preparation of sulphuric acid containing cation impurities in quanities less than $10^{-5} - 10^{-6}$ percent by weight, or the removal of volatile impurities, e.g. $SO_3''$ anion.

The object of this invention is to eliminate the above disadvantages.

The specific object of the invention is to modify the process and to provide a method of producing sulphuric acid of improved purity.

In accordance with said and other objects the invention mainly comprises a stage of distillation of sulphur trioxide and a stage of its treatment with sulphuric acid having a concentration of 95–96 wt. per cent, followed by sublimation condensation of sulphur trioxide by cooling with a coolant at a temperature from $-5°$ to $-15°$ C.

It is recommended that the sulphur trioxide should be desorbed from fuming sulphuric acid before distillation.

The proposed method of producing sulphuric acid should preferably be effected as follows.

Sulphuric acid anhydride, obtained by desorption from fuming sulphuric acid, or by oxidizing sulphur dioxide, undergoes distillation purification from hardly volatile impurities, e.g. cations of Co, Cu, Ni, Pb, Mn. Sulphur trioxide then undergoes sublimation condensation, during which volatile impurities, e.g. anion $SO_3''$ and gases, are removed. Next sulph ur trioxide is treated with a 95–96 wt. percent sulphuric acid until the monohydrate is formed. The sublimation condensation is effected at a temperature of the coolant of from $-5°$ to $-15°$ C. under atmospheric pressure.

Cooling of the crystallization surface to $-5°$ C. is necessary to realize the process of sublimation condensation, when the appearing crystals of sulphur trioxide displace volatile impurities before the crystallization into the vapour phase. At higher temperature of the coolant, condensation of liquid sulphur trioxide can occur on the surface, followed by crystallization with entrainment of easily volatile admixtures.

As the temperature of the coolant decreases below $-15°$ C., condensation of liquid sulphur dioxide can occur. In these cases the purity of sulphur trioxide, with respect to volatile impurities ($SO_3''$ anion in particular), decreases significantly.

The herein-proposed method of producing sulphuric acid of particularly high purity is realized in a plant of sterile materials and no impurities are washed out from them.

The incorporation of the sublimation condensation stage ensures preparation of sulphuric acid of special purity containing cations in the range of about $10^{-7} - 10^{-8}$ percent by weight, and anions, $SO_3''$ in particular, $5 \times 10^{-5}$ percent by weight.

The product of this quality fully meets the exacting requirements of modern electronic, electrotechnical and other branches of industry and science.

For a better understanding of the invention, the following examples of its practical embodiment are given by way of illustration.

EXAMPLE 1

Fuming sulphuric acid is placed in a desorber and the temperature is raised gradually to 200° C. The $SO_3$ content of the acid is about 60 percent by weight.

Sulphur trioxide evolved from the fuming sulphuric acid is passed into a rectification column. After purification by distillation, the sulphur trioxide is passed into a sublimation condenser cooled with fluorine- and chlorine derivatives of saturated hydrocarbons having a temperature of $-5°$ C. Sulphur trioxide is crystallized on the cooled surface for 1 to 1.5 hours.

Since the heat-transfer process becomes less efficient by the end of the process, in addition to crystals minute droplets of liquid sulphur trioxide are also formed.

Non-condensed gas and readily volatile impurities are trapped in a system comprising a freezing out device, absorbers filled with sulphuric acid and alkali, and an absorber packed with activated carbon.

The crystals of sulphur trioxide are dissolved from the condenser surfaces by sulphuric acid having a concentration of 95 to 96 percent.

After the stage of the acid saturation to the concentration in the range of 98–99 wt. percent with pure sulphur trioxide, water of special purity is delivered into the absorber to dilute the obtained acid to 95–96 wt. percent concentration.

The obtained sulphuric acid contains the following quantities of cations, in percent by weight:

Co $5 \times 10^{-8}$
Cu $1 \times 10^{-7}$
Ni $5 \times 10^{-8}$
Pb $5 \times 10^{-8}$
Mn $1 \times 10^{31\ 7}$ The content of substances reducing $KMnO_4$ is $1 \times 10^{-4}$ per cent by weight (as $SO_3''$).

EXAMPLE 2

The procedure is the same as described in Example 1, except that the sublimation condenser is cooled with the fluorine- and chlorine derivatives of saturated hydrocarbons at a temperature in the range of $-15°$ C.

Sulphur trioxide is crystallized on the cooled surface for 1 to 1.5 hours.

During the first 30 to 40 minutes, sulphur trioxide crystals retain small quantities of liquid sulphur dioxide, but as the heat conductivity is further impaired, this phenomenon disappears.

The obtained sulphuric acid contains cations in the same quantities as specified in Example 1. The content of substances reducing $KMnO_4$ is $5 \times 10^{-4}$ percent by weight (as $SO_3''$).

EXAMPLE 3

The procedure is the same as in Example 1, except that the sublimation condenser is cooled with the fluorine- and chlorine derivatives of saturated hydrocarbons at a temperature in the range of $-10°$ C.

The process of crystallization of sulphur trioxide is not accompanied by partial melting of sulpur trioxide, nor by the retainment of liquid sulphur dioxide.

Clearly shaped crystals of sulphur trioxide are formed on the cooled surfaces of the sublimation condenser.

The obtained sulphuric acid contains cations in the same quantities as specified in Example 1.

the content of substances reducing $KMnO_4$ is $5 \times 10^{-5}$ percent by weight (as $SO_3''$).

We claim:

1. Method of producing sulfuric acid of high purity, which comprises distilling sulfur trioxide, subjecting the thus distilled sulfur trioxide to sublimation condensation by cooling with a coolant at a temperature from $-5°$ to $-15°$ C., thus forming crystals of sulfur trioxide, and dissolving said crystals of sulfur trioxide with sulfuric acid of 95 to 96 percent concentration, thus obtaining sulfuric acid of high purity containing cations in the range of about $10^{-7}$ to $10^{-8}$ percent by weight, and anions, $SO_3 =$ in particular, $5 \times 10^{-5}$ percent by weight.

2. A method according to claim 1, in which the sulphur trioxide for distillation is desorbed from fuming sulphuric acid.

* * * * *